W. D. ADDISON.
CHAIN GUARD FOR VEHICLE WHEELS.
APPLICATION FILED JULY 28, 1916.
1,295,669.
Patented Feb. 25, 1919.
Fig. 1.
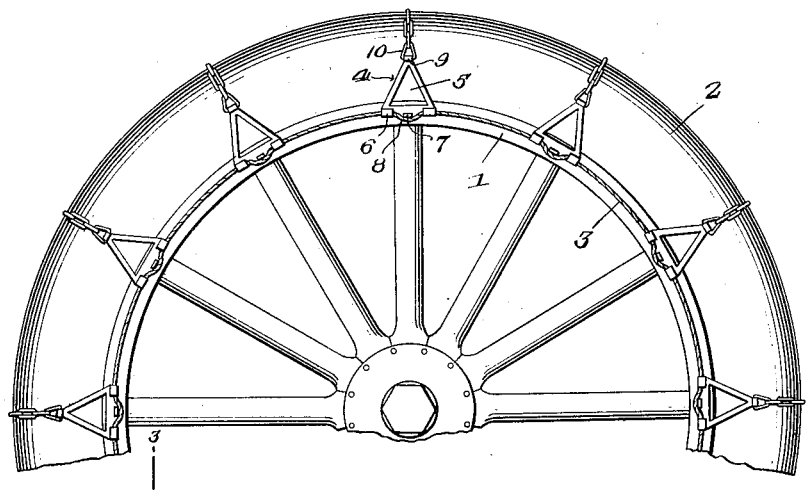
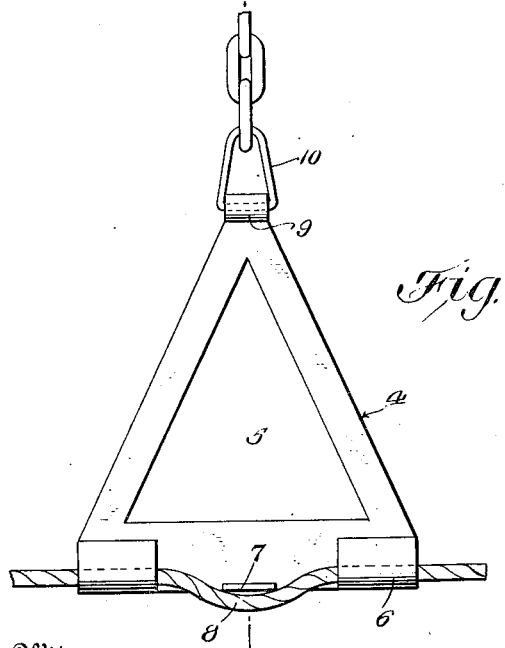
Fig. 2.
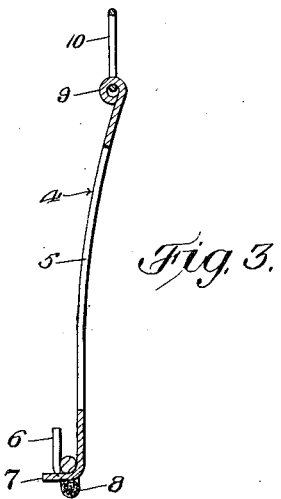
Fig. 3.
Inventor
W. D. Addison,
By Victor J. Evans
Attorney
Witnesses
J H Crawford
J W Garner

UNITED STATES PATENT OFFICE.

WILLIAM D. ADDISON, OF MANNING, IOWA.

CHAIN GUARD FOR VEHICLE-WHEELS.

1,295,669.  Specification of Letters Patent.  Patented Feb. 25, 1919.

Application filed July 28, 1916. Serial No. 111,919.

*To all whom it may concern:*

Be it known that I, WILLIAM D. ADDISON, a citizen of the United States, residing at Manning, in the county of Carroll and State of Iowa, have invented new and useful Improvements in Chain Guards for Vehicle-Wheels, of which the following is a specification.

This invention relates to improvements in chain guards for vehicle wheels and especially with reference to improvements in the construction of the coupling elements which connect the cross chains to the endless cables, one object of the invention being to provide means for locking the coupling element to the endless cable, so that the coupling element is effectually prevented from slipping on the cable and yet may be readily detached therefrom at will; another object being to provide means whereby the coupling elements, when the car is pulling and the tire comes in contact with the ground, causes the cables to be kinked and thereby shortened and the lower cross chains to be locked to the tire; another object being to provide an improved form of coupling element which slightly changes the position of the cross chain on the tire and hence avoids undue wear on restricted areas of the tire surface.

The invention consists in the features of construction, combination, and arrangement of devices, hereinafter fully described and claimed.

In the accompanying drawings:—

Figure 1 is a side elevation of a portion of an automobile wheel provided with a chain guard having coupling elements constructed and arranged in accordance with my invention.

Fig. 2 is a detail elevation on a larger scale, of one of the coupling elements, the cable and a portion of a cross chain.

Fig. 3 is a detail sectional view of the same on the plane indicated by the line 3—3 of Fig. 1.

For the purposes of this specification, the rim of an automobile wheel is indicated at 1 and the tire at 2. One of the usual endless cables is indicated at 3. The coupling elements which connect the cross chains to the cables are shown at 4. In the preferred embodiment of my invention here shown, each coupling element is a sheet metal plate forming an isosceles triangle provided with a central triangular opening 5 and also provided at the base with spaced hooks 6 for engaging the inner side of the cable and further provided at a point midway between the hooks with an outturned lug 7 for engaging the outer side of the cable. This lug is in line with the bight of the hooks so that that portion of the cable between the hooks 6 and the lug 7 is bent inwardly by said lug as at 8. Hence the coupling element while adapted to be readily detached from the cable when desired, is by the provision of the hooks 6 and lugs 7 and the formation of the bend 8 in the cable so firmly connected to the cable as to be effectually prevented from slipping thereon.

The plate is provided at its outer end or apex with a loop 9, to which one end of the cross chain is attached by a link 10. Longitudinally the coupling plate is bent, as shown in Fig. 3, to conform to the shape of the wheel rim and tire.

When the car is pulling, the tension of the lowermost cross chains on the coupling elements, causes the latter to turn from a radial to a substantially tangential position on the wheel, thereby kinking and shortening the cables and hence locking the chain guard securely to the wheel and preventing it from creeping or yielding thereon. When the car is not pulling, the lock is released.

The alternate tightening and relaxing of the cables and the angular movement of the coupling elements cause the latter to very slightly shift and change the position of the cross chains on the tire so that the cross chains do not bear constantly on the same portions of the surface of the tire but slightly shift their positions thereon from time to time as the wheel revolves, so that undue wear of the cross chains on the tire is prevented.

From the foregoing description, taken in connection with the accompanying drawing, the advantages of construction and of the method of operation will be readily apparent to those skilled in the art to which the invention relates, and while I have described the principles of operation of the device together with the device which I now consider to be the best embodiment thereof, I desire to have it understood that the device shown is merely illustrative and that such changes may be made when desired as are within the scope of the claim appended hereto.

What is claimed is:

A connector comprising a triangular plate, an attaching gear formed at one angle of said plate, a pair of spaced lugs on the opposite edge of said plate extending in spaced parallel relation to said plate, and a single lug on said edge between said first named lugs and extending at right angles to the plate.

In testimony whereof I affix my signature.

WILLIAM D. ADDISON.